(12) United States Patent
Kuwahara

(10) Patent No.: US 8,110,059 B2
(45) Date of Patent: Feb. 7, 2012

(54) THREE-DIMENSIONAL DECORATION PIECE MADE OF SYNTHETIC RESIN AND METHOD OF MANUFACTURING THE SAME

(75) Inventor: Eiji Kuwahara, Osaka (JP)

(73) Assignees: Nobuo Kuroda, Osaka (JP); Eiji Kuwahara, Osaka (JP)

( * ) Notice: Subject to any disclaimer, the term of this patent is extended or adjusted under 35 U.S.C. 154(b) by 604 days.

(21) Appl. No.: 11/667,544

(22) PCT Filed: Sep. 29, 2005

(86) PCT No.: PCT/JP2005/018483
§ 371 (c)(1), (2), (4) Date: May 11, 2007

(87) PCT Pub. No.: WO2006/051661
PCT Pub. Date: May 18, 2006

(65) Prior Publication Data
US 2007/0296118 A1 Dec. 27, 2007

(30) Foreign Application Priority Data
Nov. 11, 2004 (JP) ................................ 2004-327285

(51) Int. Cl.
*B27N 3/20* (2006.01)
(52) U.S. Cl. ..................................... 156/245; 156/272.2
(58) Field of Classification Search .................. 156/196, 156/210, 219, 245, 272.2, 221, 222, 223; 264/32, 293, 319, 294, 454, 241
See application file for complete search history.

(56) References Cited

U.S. PATENT DOCUMENTS
3,265,551 A * 8/1966 Ananian et al. ............... 156/219
(Continued)

FOREIGN PATENT DOCUMENTS
JP B 45-1759 1/1970
(Continued)

OTHER PUBLICATIONS
Machine Translation of JP 05254297 A, Mar. 27, 2009.*

*Primary Examiner* — Richard Crispino
*Assistant Examiner* — Daniel McNally
(74) *Attorney, Agent, or Firm* — Oliff & Berridge, PLC

(57) ABSTRACT

There are provided (1) a method of manufacturing a three-dimensional decoration piece having a flat rear surface, (2) a method of manufacturing the decoration piece by easily cutting the same by means of a fusion cutter, (3) a method of manufacturing the decoration piece having a bonding or sticking feature on the rear surface and (4) a method of manufacturing a three-dimensional decoration piece without limiting the characteristics of the base member thereof.

The three-dimensional decoration piece is manufactured by using an indented mold and high frequency dielectric heating. An indented mold having a second fusion cutter and arranged along an outer periphery of the fusion cutter is used. Firstly, a three-dimensional molded body of upper and intermediate layers having a recessed section on a lower surface thereof is molded by means of an indented mold and a protruding mold, and subsequently a lower layer material is molten by high frequency dielectric heating and made to flow into the recessed section. Firstly, a three-dimensional molded body of upper and intermediate layers is molded, and subsequently the three-dimensional molded body is welded to a base member by means of high frequency dielectric heating.

1 Claim, 9 Drawing Sheets

U.S. PATENT DOCUMENTS 3,617,589 A * 11/1971 Jones-Hinton et al. ....... 264/453
4,734,147 A * 3/1988 Moore .......................... 156/212
5,589,022 A * 12/1996 Kuwahara .................... 156/231

FOREIGN PATENT DOCUMENTS

| | | |
|---|---|---|
| JP | B 49-27421 | 7/1974 |
| JP | 02145320 A * | 6/1990 |
| JP | B2 5-18698 | 3/1993 |
| JP | 05254297 A * | 10/1993 |
| JP | B2 7-102620 | 11/1995 |
| JP | A 8-026291 | 1/1996 |
| JP | B2 3235943 | 9/2001 |

* cited by examiner

Fig. 1
Fig. 2
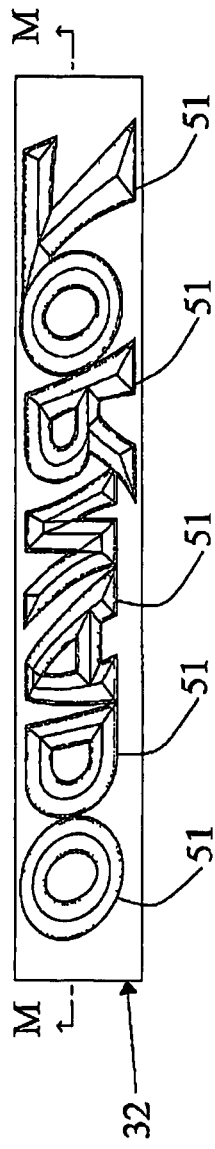
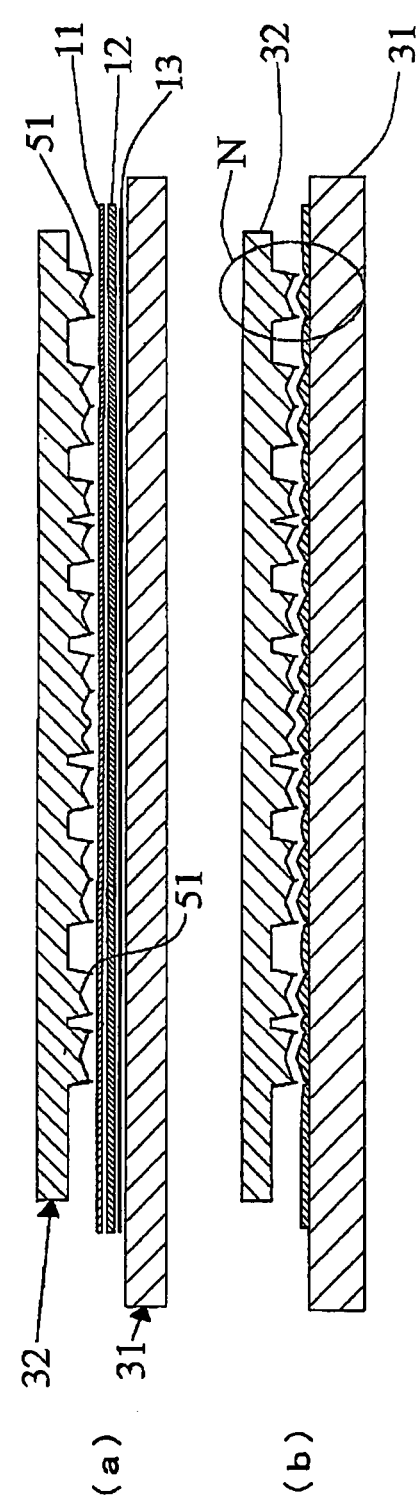

THREE-DIMENSIONAL DECORATION PIECE MADE OF SYNTHETIC RESIN AND METHOD OF MANUFACTURING THE SAME

BACKGROUND OF THE INVENTION

This invention relates to an improvement to a method of manufacturing a decoration piece of synthetic resin that is adapted to be mainly fitted to an automobile, a bicycle, a motor boat, an OA apparatus, a home use electric appliance, a sporting good, a writing article, a bag, a wear or the like.

JP-B-05-018698, JP-B-07-102620 and JP-B-3235943 disclose methods of manufacturing a three-dimensional decoration piece of synthetic resin such as an emblem, using a metal mold and high frequency dielectric heating.

However, the inventions disclosed in the above JP-B-05-018698 and JP-B-07-102620 employ both a protruding mold and an indented mold. A three-dimensional decoration piece is manufactured between the protruding mold and the indented mold. Thus, the manufactured three-dimensional decoration piece is not flat at the rear surface, but has a recess (hollow) at the rear side. Then, the area of the piece to be bonded or to be made to adhere to the object of mounting, which may be an automobile, is very small. Therefore, such a piece is required to show a strong bonding or sticking effect. Additionally, both the protruding mold and the indented mold are required to be dimensionally highly accurate. The above cited JP-B-3235943 does not disclose any method that employs a protruding mold and a indented mold.

With the manufacturing methods disclosed in the above JP-B-05-018698 and JP-B-07-102620, a three-dimensional pattern is molded in the inside of a fusion cutter which cuts the inner part of the pattern from the outer part. However, the outer part is pulled by the fusion cutter at the time of cutting, so as to make the cutting operation difficult.

Additionally, with the manufacturing methods disclosed in the above JP-B-05-018698 and JP-B-07-102620, a material is pinched between an indented mold and a protruding mold, and the material is pressed by the metal molds. As a protruding mold is used, protrusions and indentations are formed at the rear side of the manufactured three-dimensional decoration piece. Therefore, if a bonding or sticking layer is to be formed on the rear surface of the three-dimensional piece as a lining layer during the manufacturing process, it is not possible to use a sticking material such as a sticky tape for the lining layer. If a thermally adhesive material is used as lining material, the lining material will become flat as it is pressed. Thus, it is not possible to manufacture a three-dimensional decoration piece having an adhesive feature on the rear surface. If such a pattern is manufactured, the effective bonding strength would be low and poor.

Furthermore, with the manufacturing methods disclosed in the above JP-B-05-018698 and JP-B-07-102620, a material is pinched between an indented mold and a protruding mold, and the material is pressed by the metal molds. When a three-dimensional piece is molded directly on a base member that may be a fabric, the base member is also pulled by the indented mold and the protruding mold. Thus, when molding a three-dimensional piece directly on a base member that may typically be a fabric, the base member is required to be extensible. Thus, candidate materials that can be used for the base member are limited to extensible fabrics or the like.

According to any of the inventions disclosed in the above cited patent documents, while it is possible to weld the thermoplastic synthetic resin material from which a three-dimensional piece is molded and a base member that may typically be a fabric, the thermoplastic synthetic resin material is welded to the base member at the parts of the molded product other than the three-dimensional pattern (unnecessary parts). Then, it is difficult to remove the unnecessary parts. The cur surfaces can be coarse ones if the unnecessary parts are removed by cutting.

SUMMARY OF THE INVENTION

In view of the above identified circumstances, it is therefore an object of the present invention to provide a method of manufacturing a three-dimensional pattern having a flat lower surface without indented part.

Another object of the present invention is to provide a method of manufacturing a three-dimensional pattern that can be easily cut by a fusion cutter.

Still another object of the present invention is to provide a method of manufacturing a three-dimensional piece molded integrally with a lower layer material having bonding or sticking feature.

Still another object of the present invention is to provide a method of manufacturing a three-dimensional piece by molding it directly on a base member such as a fabric without limitations to the characteristics of the base member, from which unnecessary parts can be easily removed.

In the first aspect of the present invention, the above objects are achieved by providing a method of manufacturing a three-dimensional decoration piece made of synthetic resin, comprising:

laying a lower layer material having a bonding or sticking feature, an intermediate layer material of a thermoplastic synthetic resin material and an upper layer material of a thermoplastic synthetic resin material on a cathode having a flat surface; and pressing the layer materials from above by an indented mold operating as anode, to melt and mold the materials by high frequency dielectric heating, so as to form the three-dimensional decoration piece.

Preferably, said indented mold is provided with a first fusion cutter, and a second fusion cutter or pressing blade. Said first fusion cutter is arranged at a position corresponding to a contouring part of the three-dimensional decoration piece to cut a part of the materials where a three-dimensional pattern is molded. Said second fusion cutter or pressing blade is arranged outside and along a position corresponding to a contouring part of the three-dimensional decoration piece. Preferably, said second cutter (fusion cutter or pressing blade) is placed externally relative to said first fusion cutter, and separated from the first fusion cutter by 2 to 10 mm.

In the second aspect of the present invention, there is provided a method of manufacturing a three-dimensional decoration piece made of synthetic resin, wherein laying an intermediate layer material of a thermoplastic synthetic resin and an upper layer material of a thermoplastic synthetic resin on a protruding mold of cathode;

pressing the layers material from above by an indented mold of anode, to melt and mold the materials by high frequency dielectric heating, so as to form a three-dimensional molded body, said molded body being formed with a recessed section on a lower surface thereof, said molded body being temporarily anchored to the indented mold;

pulling up the indented mold with the molded body;

laying a lower layer material having a boding or sticking feature on a cathode having a flat surface;

lowering the indented mold onto the cathode to press the layer materials; and melting the lower layer material by high frequency dielectric heating, so that the lower layer material flows into the recessed section, so as to weld the molded body and the lower layer material.

In the third aspect of the present invention, there is provided a method of manufacturing a three-dimensional decoration piece made of synthetic resin, comprising:

laying an intermediate layer material of a thermoplastic synthetic resin and an upper layer material of a thermoplastic synthetic resin material on a cathode;

pressing the layers material from above by an indented mold of anode, to melt and mold the materials by high frequency dielectric heating, so as to form a three-dimensional molded body, and to temporarily anchoring the three-dimensional molded body to the indented mold;

pulling up the indented mold with the three-dimensional molded body;

laying a base member unmeltable by transmission of a high frequency wave on a cathode having a flat surface;

lowering said indented mold onto said cathode, to press the three-dimensional molded body and the base member, melting the three-dimensional molded body by high frequency dielectric heating, to weld it to the base member.

In the fourth aspect of the present invention, there is provided a method of manufacturing a three-dimensional decoration piece made of synthetic resin, comprising:

laying an intermediate layer material of a thermoplastic synthetic resin and an upper layer material of a thermoplastic synthetic resin material on a protruding mold of cathode;

pressing the layers material from above by an indented mold of anode, to melt and mold the materials by high frequency dielectric heating, so as to form a three-dimensional molded body, said molded body being formed with a recessed section on a lower surface thereof, said molded body being temporarily anchored to the indented mold;

pulling up the indented mold with the three-dimensional molded body;

laying a base member unmeltable by transmission of a high frequency wave on a cathode having a flat surface;

lowering said indented mold onto said cathode, to press the three-dimensional molded body and the base member, melting the three-dimensional molded body by high frequency dielectric heating, to weld it to the base member.

Preferably, said recessed section is located on an outer periphery of a contour line of the three-dimensional decoration piece.

Thus, since a cathode having a flat surface is used in the first aspect of the present invention, no indented part (cavity) is produced on the rear surface of the three-dimensional piece manufactured by the method. Therefore, the entire rear surface of the three-dimensional piece manufactured by the method can be bonded or stuck to an object of mounting such as an automobile. Thus, it is possible to manufacture a three-dimensional piece that can be reliably bonded or stuck to an object of mounting. Additionally, since a three-dimensional decoration piece can be manufactured without using a protruding mold, it can be easily manufactured, because there is no requirement for accuracy and precision of dimensional agreement of an indented mold and a protruding mold. Still additionally, since it is no longer necessary to prepare a protruding mold, and since the manufacturing process is not required to be highly accurate, it is now possible to reduce the cost of manufacturing a three-dimensional decoration piece.

When a second cutter (a fusion cutter or a pressing blade) is arranged along the outside of the first fusion cutter for cutting a part or parts where the three-dimensional pattern is molded, the material part located outside the first fusion cutter is pressed by the second cutter (the fusion cutter or the pressing blade, whichever appropriate), and hence not pulled inward from the first fusion cutter, so that the first fusion cutter can perform the cutting operation effectively.

When said second cutter (the fusion cutter or the pressing blade, whichever appropriate) is arranged externally relative to said first fusion cutter and separated from the latter by 2 to 10 mm, the end sections of the three-dimensional decoration piece are not deformed, and the second cutter (the fusion cutter or the pressing blade, whichever appropriate) exerts a keeping effect, and the materials are consumed less with the manufacturing method in the invention.

In the second aspect of the invention, since three-dimensional molded body of the upper and intermediate layers is molded with one or more than one indented (recessed) parts formed on the lower surface thereof, the lower layer material flows into the indented parts when the lower layer material is molten by high frequency dielectric heating. Thus, it is possible to manufacture a three-dimensional piece having a bonding or sticking feature on the rear surface thereof.

In the third and fourth aspects of the invention, the three-dimensional molded body of the upper and intermediate layers is welded to the base member on a cathode having a flat surface, the base member is not stretched by indented and protruding molds. Therefore, this invention provides an advantage that the base member is not required to have an stretchable characteristic. Additionally, the welding process is conducted on a flat cathode, so that neither the three-dimensional molded body of the upper and intermediate layers nor the base member is stretched. Then, the three-dimensional molded body of the upper and intermediate layers and the base member can be welded over the entire surfaces thereof to increase the bonding strength between the three-dimensional molded body of the upper and intermediate layers and the base member.

In the fourth aspect of the invention, the three-dimensional molded body of the upper and intermediate layers and the base member are not welded to each other at one or more than one desired areas (the three-dimensional molded body of the upper and intermediate layers is apart from the base member), the manufactured three-dimensional decoration piece can be cut at the one or more than one desired areas. Thus, any unnecessary part can be easily removed, and the manufactured three-dimensional decoration piece is neatly finished at the cut area or areas.

BRIEF DESCRIPTION OF THE DRAWINGS

FIG. 1 is a schematic bottom view of an indented mold that is employed in the first embodiment of the present invention.

FIG. 2 is a schematic sectional view of a table and the indented mold of FIG. 1, the sectional views of the indented mold being taken along line M-M in FIG. 1, illustrating a manufacturing step of the first embodiment. FIG. 2(a) illustrates a state before the high frequency dielectric heating step, and FIG. 2(b) illustrates a state after the high frequency dielectric heating step.

FIG. 8(a) illustrates a state before the first high frequency dielectric heating step. FIG. 8(b) illustrates a state after the first high frequency dielectric heating step. FIG. 8(c) illustrates a state after the first high frequency dielectric heating step and after laying the lower layer material. FIG. 8(d) illustrates a state after the second high frequency dielectric heating step.

FIG. 12(a) illustrates a state after the first high frequency dielectric heating step. FIG. 12(b) illustrates a state after laying the base member.

FIG. 15(a) illustrates a state after the first high frequency dielectric heating and before the protruding mold is removed. FIG. 15(b) illustrates a state after replacing the protruding mold with a flat mold. FIG. 15(c) illustrates a state after the second high frequency dielectric heating step.

PREFERRED EMBODIMENTS OF THE INVENTION

Figure 3:
FIG. 3 is a schematic plan view of a three-dimensional decoration piece manufactured by the first embodiment of the present invention.

As will be described hereinafter, a three-dimensional decoration piece is manufactured by a method according to the present invention, using an upper layer material, an intermediate layer material and a lower layer material, except the fourth embodiment. The upper layer material and the intermediate layer material may be laid in advance to form an integral unit.

The upper layer material may be thermoplastic synthetic resin film as it is to make a surface of the manufactured three-dimensional decoration piece esthetically appealing. Examples of materials that can be used as the upper layer material include polyvinyl chloride film, polyurethane film, polyester film and polyolefin film etc.

Metal may be deposited on the thermoplastic synthetic resin film by evaporation to make the three-dimensional decoration piece appear as if it were made of metal. Examples of such materials include metal deposited polyvinyl chloride film, metal deposited polyurethane film, metal deposited polyester film and metal deposited polyolefin film etc. The metal may be aluminum, chromium etc.

The thermoplastic synthetic resin film may be multilayer film.

Thus, the upper layer material is selected appropriately according to the three-dimensional decoration piece to be manufactured.

The intermediate layer material is to make the three-dimensional decoration piece appear massive and substantial. Thermoplastic synthetic resin may be used for it. Examples of materials that can be used as the intermediate layer material include polyvinyl chloride sheets and polyurethane sheets etc. The intermediate layer material may be a foamed material of thermoplastic synthetic resin. Examples of such materials include foamed polyvinyl chloride sheets and foamed polyurethane sheets etc. Thus, the intermediate layer material is selected appropriately according to the three-dimensional decoration piece to be manufactured.

The lower layer material has a bonding or sticking feature for mounting the three-dimensional decoration piece to an object of mounting (an automobile, a wear, a miscellaneous article or the like). For example, thermoplastic synthetic resin film carrying a double-face sticky tape or thermoplastic synthetic resin carrying a sticky tape with an adhesive material may be used. The lower layer material itself may have a sticking feature. Examples of materials having a sticking feature include polyurethane type hot-melt film, polyamide type hot-melt film, polyester type hot-melt film and EVA type hot-melt film etc.

Thus, the lower layer material is selected appropriately according to the three-dimensional decoration piece to be manufactured.

In the case of the fourth embodiment according to which a three-dimensional decoration piece is directly formed on a base member that may be a fabric, it is not necessary to use a lower layer material to provide the three-dimensional decoration piece with a sticking feature. Additionally, since the base member should not be molten by high frequency dielectric heating, a fabric may typically be used for the base member.

Now, the first embodiment of the present invention will be described. The first embodiment is intended to manufacture a three-dimensional decoration piece without using a protruding mold, and comprises:

(1) laying sequentially a lower layer material (13), an intermediate layer material (12) and an upper layer material (11) on a cathode (table 31) having a flat surface; and (2) pressing the material layers from above by an indented mold (32) operating as anode, and melting and molding the materials by high frequency dielectric heating, to manufacture a three-dimensional decoration piece. The thus manufactured decoration piece has a flat rear surface having no indented part.

FIGS. 1-4 illustrate the first embodiment of the present invention.

FIG. 1 is a schematic bottom view of the indented mold 32 that is employed in the first embodiment of the invention. FIG. 2A is a schematic sectional view of the indented mold 32 taken along line M-M in FIG. 1, with the upper layer material 11, the intermediate layer material 12, the lower layer material 13 and the table 31. It shows a state before the high frequency dielectric heating step. FIG. 2B is a schematic sectional view similar to FIG. 2A, but shows a state after the high frequency dielectric heating step and after pulling up the indented mold 32.

FIG. 3 is a schematic plan view of a three-dimensional decoration piece 91 manufactured by the first embodiment of the invention.

Figure 4:
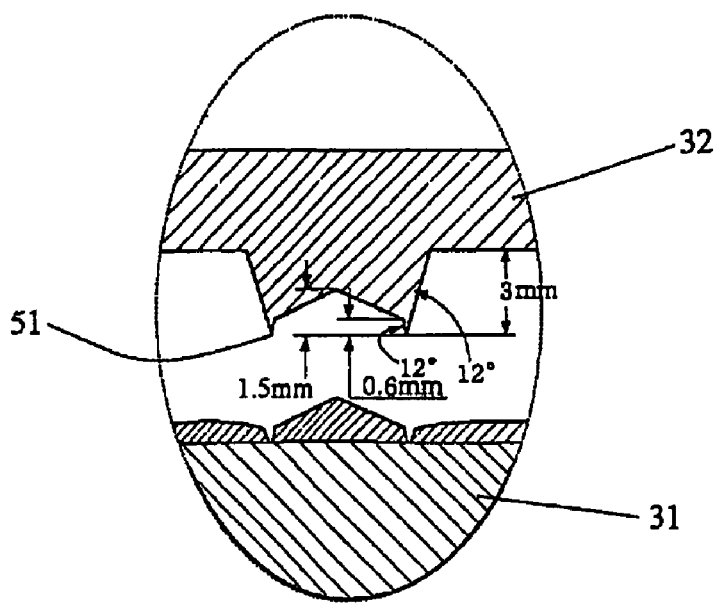
FIG. 4 is an enlarged schematic view of an area indicated by N in FIG. 2.

FIG. 4 is an enlarged schematic view of the area N surrounded by an ellipse in FIG. 2.

A high frequency dielectric heater to be used for the first embodiment includes a table 31, which is a cathode, and an indented mold 32 that operates as anode. As seen from FIG. 2, it is sufficient for the cathode to be a table 31 (or a flat mold) having a flat surface.

The indented mold 32 is provided with a fusion cutter 51 for melting/cutting the material. The cutter 51 is arranged at a position corresponding to a contouring part of the three-dimensional decoration piece.

Dimensions of the cutter 51 may typically such as those shown in FIG. 4, although the present invention is by no means limited to those numerical values. In other words, they may be selected appropriately depending on dimensions of the three-dimensional pattern.

Now, the method of manufacturing a three-dimensional decoration piece 91 by using the above described materials and a high frequency dielectric heater will be described below.

Firstly, the lower layer material 13 is laid on the table, and then the intermediate layer material 12 is laid on the lower layer material 13. Subsequently, the upper layer material 11 is laid on the intermediate layer material 12 (FIG. 2A). Although not shown, a mold releasing paper is applied to a rear surface (a lower surface in FIG. 2A) of the lower layer material 13 (hot-melt film, an adhesive tape or the like).

The indented mold 32 is lowered onto the materials from above to press the materials, and then a high frequency wave is caused to be emitted. The materials become molten by the heat generated by the high frequency wave. Then, the molten materials flow into an inside of the fusion cutter 51 of the indented mold 32, and cut by the fusion cutter 51. Thus, the materials are molten and flow into the inside of the fusion cutter 51 of the indented mold. Since the table 31 has a flat surface, the rear surface (the lower surface in FIG. 2) of the molded three-dimensional piece 91 is made flat.

After cooling, the materials are taken out from the mold 32, and unnecessary parts are removed to produce a three-dimensional decoration piece 91. A transparent application film is applied to the surface of the manufactured piece 91 in order to maintain the relative positional relationship of the parts of the piece 91 (for example, the relative positions of N and A in the instance of FIG. 3).

Now, the second embodiment of the present invention will be described below.

In the second embodiment, an indented mold is provided with a second fusion cutter which is arranged outside the fusion cutter of the above described first embodiment, to manufacture a three-dimensional decoration piece. The three-dimensional decoration piece manufacturing method of the second embodiment comprises:

(1) laying sequentially a lower layer material, an intermediate layer material and an upper layer material on a cathode (table or a flat mold) having a flat surface; and (2) pressing the material layers from above by an indented mold (132) operating as anode, and melting and molding the materials by high frequency dielectric heating.

The indented mold (132) is equipped not only with a first fusion cutter (151) but also a second cutter (a fusion cutter or a pressing blade) 152. The first cutter (151) corresponds to a contouring part of the three-dimensional decoration piece, and is adapted to cut a part or parts of the three-dimensional decoration piece molded from the materials. The second cutter (152) is arranged externally relative to a position corresponding to and along the contouring part of the three-dimensional decoration piece.

The materials used for the second embodiment include those listed above for the upper layer material, the intermediate layer material and the lower layer material, although the second embodiment is by no means limited to those materials of the three layers.

Figure 5:
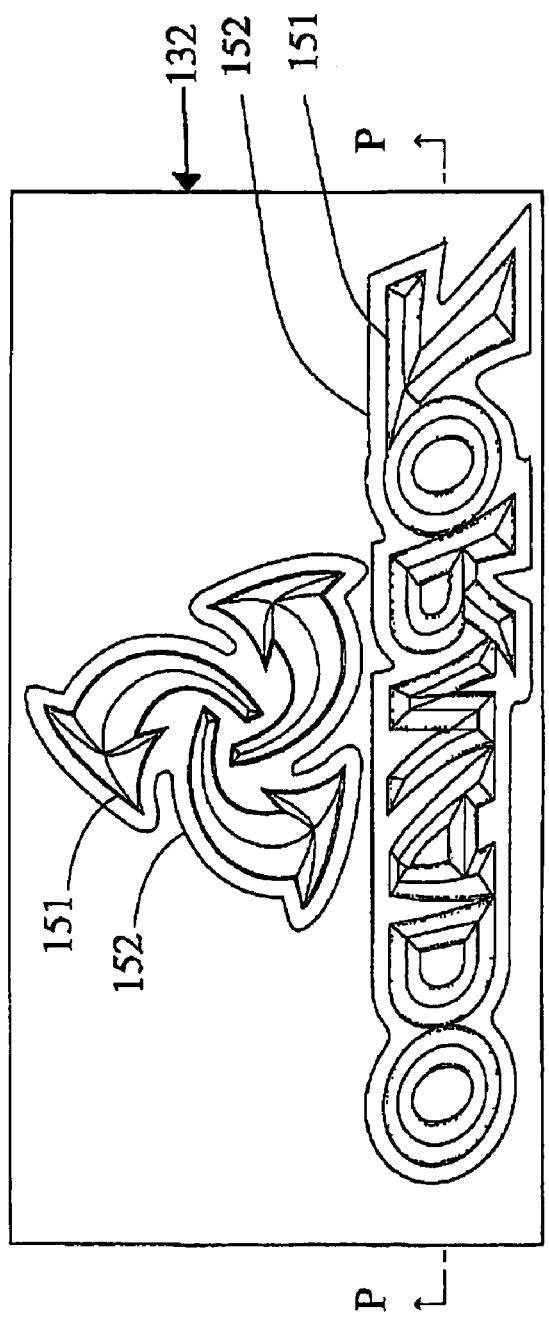
FIG. 5 is a schematic bottom view of the indented mold used in the second embodiment of the present invention.
Figure 6:
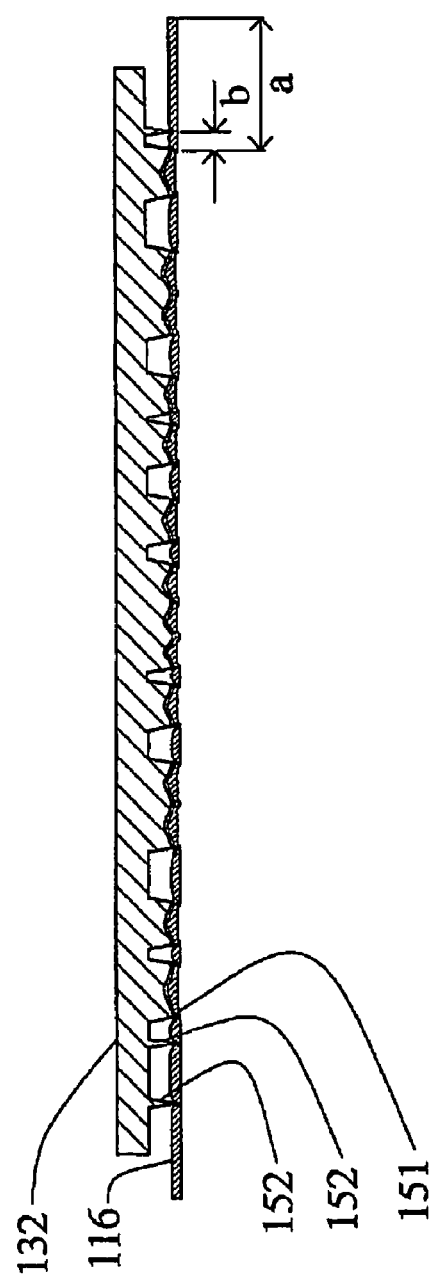
FIG. 6 is a schematic sectional view of the indented mold of FIG. 5 taken along line P-P in FIG. 5.

FIG. 5 is a schematic bottom view of the indented mold 132 (anode) employed in the second embodiment. FIG. 6 is a schematic sectional view of the indented mold 132 of FIG. 5 taken along line P-P in FIG. 5.

The indented mold 132 has a first fusion cutter 151 and a second fusion or a pressing blade 152. The first fusion cutter 151 is arranged at a position that corresponds to the contouring part of the three-dimensional decoration piece, and adapted to cut the part or parts of the three-dimensional decoration piece from the materials.

While the first fusion cutter 151 is arranged at a position that corresponds to the contouring part of the three-dimensional decoration piece, the second fusion or pressing blade 152 is arranged outside and along the position that corresponds to the contouring part of the three-dimensional decoration piece (and hence the position of the first fusion cutter). The second cutter 152 may be a fusion cutter that operates to cut the materials like the first fusion cutter 151, or be a pressing blade or pressing blade that simply presses the materials.

The second cutter 152 is arranged in close proximity to the outer periphery of the first fusion cutter. Preferably, the second cutter 152 is arranged outside the first fusion cutter 151, and separated from the latter by a distance of 2 to 10 mm. When the distance is less than 2 mm, the second cutter 152 can pull too strongly the materials in an inside of the first fusion cutter (in other words, the edge part of the decoration piece), to deform such portion. When the distance exceeds 10 mm, the pressing effect of the second cutter 152 is insignificant, and the indented mold becomes excessively large and wastes the materials.

A table same as that of the above described first embodiment may be employed as the cathode for the second embodiment. Alternatively, a protruding mold as will be described hereinafter may be used. In short, the structure of the cathode is not subjected to any limitation for the second embodiment.

When manufacturing a decoration piece with the second embodiment, firstly the materials are laid on the cathodes. Then, the indented mold 132 is lowered from above the materials, so as to press the materials, and a high frequency wave is caused to be emitted. The materials become molten, and a decoration piece 116 is molded by the heat generated by the high frequency wave. Then, the decoration piece 116 is cut by the first fusion cutter 151.

If the second cutter 152 is not provided, the entire outer part "a" of the materials (FIG. 6) located outside the first fusion cutter 151 is pulled inwardly by the first fusion cutter 151, so that the first fusion cutter 151 can not sharply cut the materials. However, since the second cutter 152 is provided in a close proximity of the first fusion cutter 151 and arranged outside the latter according to the second embodiment, the three-dimensional decoration piece 116 is held in position by the second cutter 152, outside and in a close proximity of the cutting line of the first fusion cutter 151. Thus, only the part located between the first fusion cutter 151 and the second cutter 152 (the part "b" shown in FIG. 6) is pulled inward by the first fusion cutter 151, and hence the first fusion cutter 151 shows an improved cutting effect.

Now, the third embodiment of the present invention will be described below.

In the third embodiment, the manufacturing method includes two steps, to facilitate the operation of cutting the part of the material where a three-dimensional pattern is molded.

Summarily, the third embodiment of the present invention comprises:

(1) laying an intermediate layer material and an upper layer material on a protruding mold 233 (the protruding mold 233 itself may be a cathode, or a protruding mold 233 may be placed on a table that operates as cathode);

(2) heating the upper layer and intermediate layer materials from above by means an indented mold (232) that operates as anode by high frequency dielectric heating, to melt and mold the materials, so as to manufacture an upper/intermediate layers three-dimensional molded body (216) (the first high frequency dielectric heating step);

(3) pulling up the molded body (216) with the indented mold (232);

(4) laying a lower layer material (213) on the cathode (the flat mold or the table);

(5) lowering the indented mold (232) toward the cathode, to press and heating the materials by high frequency dielectric heating in order to integrally mold the molded body (216) and the lower layer (the second high frequency dielectric heating step), to manufacture a three-dimensional decoration piece.

The materials that can be used for the third embodiment include those listed above for the upper layer material, the intermediate layer material and the lower layer material.

The indented mold 232 in the third embodiment is used for both the first high frequency dielectric heating step and the second high frequency dielectric heating step described above.

Figure 7:
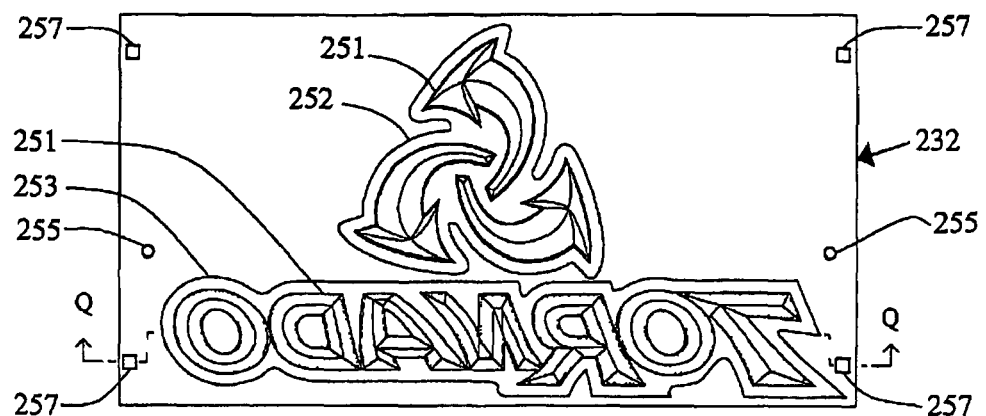
FIG. 7 is a schematic bottom view of the indented mold used in the third embodiment of the present invention.
Figure 8:
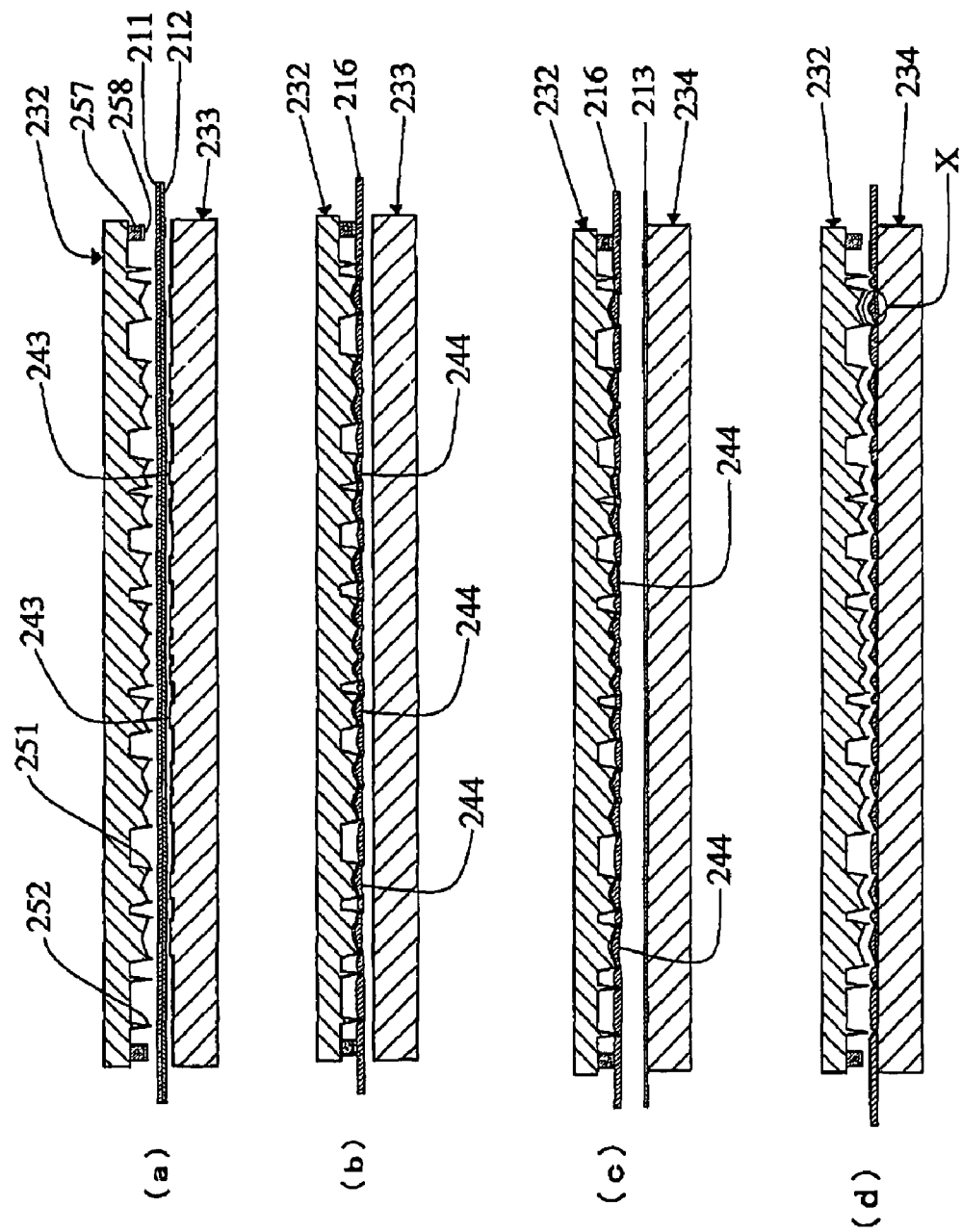
FIG. 8 shows a schematic sectional views of a table and the indented mold of FIG. 7, the sectional view of the indented mold being taken along line Q-Q in FIG. 7, illustrating a manufacturing step of the third embodiment.

FIG. 7 is a schematic bottom view of the indented mold 232. A sectional view of the indented mold 232 along line Q-Q in FIG. 7 is indicated in FIG. 8.

In the illustrated example, the indented mold 232 is provided with a second cutter (a fusion cutter or a pressing blade) 252 in addition to a first fusion cutter 251 which is arranged at a position corresponding to the contouring part of the three-dimensional decoration piece, so as to cut the part where a three-dimensional pattern is molded from the materials. However, the second cutter 252 is not essential for the third embodiment. In other words, the second cutter 252 may be omitted.

The indented mold 232 needs to be aligned with the protruding mold 232 as will be described in greater detail hereinafter. Therefore, the indented mold 232 is provided with aligning holes 255.

After the above described first high frequency dielectric heating step, the indented mold 232 is pulled up. At this time, the upper/intermediate layers three-dimensional molded body 216 is also pulled up with the indented mold 232. Therefore, the indented mold 232 is provided with temporary anchoring members 257.

The molded body 216 may be temporarily anchored by laying a sticky tape 258 on a bottom surfaces of the temporary anchoring members 257, so as to make them stick to the materials or the molded body. Alternatively, the temporary anchoring members 257 may be provided with wedge shaped holes. The upper layer material and the intermediate layer material are molten partly flow into the wedge-shaped holes (see the temporary anchoring members 357 in FIGS. 11 through 16), so that the molded body may be temporarily anchored. The temporary anchoring members 257 are arranged at the outside of a part of the materials that are molded into a three-dimensional pattern.

With the third embodiment, the protruding mold 233 is employed in the first high frequency dielectric heating step. As illustrated, the protruding mold 233 itself may operate as cathode, or alternatively the protruding mold 233 may be arranged on a table that operates as cathode.

Figure 9:
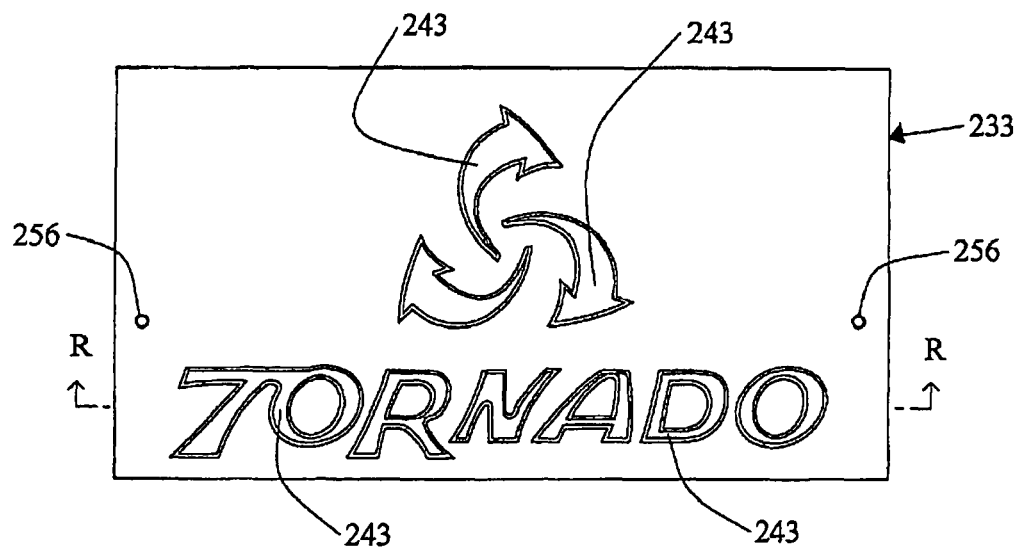
FIG. 9 is a schematic plan view of the protruding mold used in the third embodiment.

FIG. 9 is a schematic plan view of the protruding mold 233. A schematic sectional view of the indented mold along line Q-Q in FIG. 7 appears in FIG. 8.

The protruding mold 233 is employed for the purpose of producing recessed sections on the bottom surface of the molded body 216. Therefore, the protruding mold 233 is provided with protruding sections 243. The protruding sections 243 are arranged to produce recessed sections 244 on a bottom surface of the three-dimensional pattern formed in the inside of the first fusion cutter 251. Thus, the protruding sections 243 are arranged along the contour lines of the three-dimensional pattern and in the inside of first fusion cutter 251 that produces the contour lines. A distance between the contour lines of the three-dimensional pattern and the corresponding protruding sections 243 is preferably 0.2 mm to 0.5 mm. When the distance is less than 0.2 mm, the lateral walls of the three-dimensional pattern will be too thin, and it is not possible to produce a solid three-dimensional pattern. When the distance exceeds 0.5 mm, the size of the recessed sections 244 is too small, to reduce the ability of bonding the lower layer material.

The protruding mold 233 is provided with aligning holes 256 at positions that correspond to the respective aligning holes 255 of the indented mold 232. As aligning pins (not shown) are respectively driven into the aligning holes 255, 256, the indented mold 232 and the protruding mold 233 are aligned. The pins are pulled out when the indented mold 232 and the protruding mold 233 are securely held in position.

Now, the method of manufacturing a three-dimensional decoration piece of the third embodiment of the invention will be described below.

With the third embodiment, the intermediate layer material 212 is laid on the protruding mold 233 arranged on the table (not shown), and then the upper layer material 211 is laid on the intermediate layer material 212 (FIG. 8A). In this stage, no lower layer material 212 having a bonding or sticking feature is laid.

Then, the indented mold 232 is lowered. At this time, the aligning pins 255 of the indented mold 232 are driven into the corresponding aligning holes 256 of the protruding mold 233. In advance, it should be cut out and remove parts of the materials that can obstruct an operation of driving the aligning pins 255 into the corresponding aligning holes 256.

Then, the indented mold 232 is forced to press the upper layer material 211 and the intermediate layer material 212. As a high frequency wave is caused to be transmitted in this state, the upper layer material 211 and the intermediate layer material 212 are molten and a three-dimensional pattern is molded to produce an upper/intermediate layers three-dimensional molded body 216. At this time, recessed sections 244 are produced in an area located inside of the contour line of the three-dimensional pattern on the bottom surface of the molded body 216, due to the protruding sections 243.

Since the molded body 216 is pressed by the indented mold 232, it is temporarily anchored by the temporary anchoring members 257 (stuck by the sticky tapes 258).

Subsequently, as the indented mold 232 is raised, the molded body 216 with the molded three-dimensional pattern is raised with the indented mold 232 due to the sticky tapes 258 of the temporary anchoring members 257 (FIG. 8b).

Then, the protruding mold 233 is replaced by a flat mold 234 that operates as cathode. The lower layer material 213 is laid on the flat mold 234 (FIG. 8c).

Thereafter, the indented mold 232 with the molded body 216 is lowered toward the flat mold 234 on which the lower layer material 213 is laid, until the bottom surface of the molded body 216 contacts the top surface of the lower material layer 213.

Figure 10:
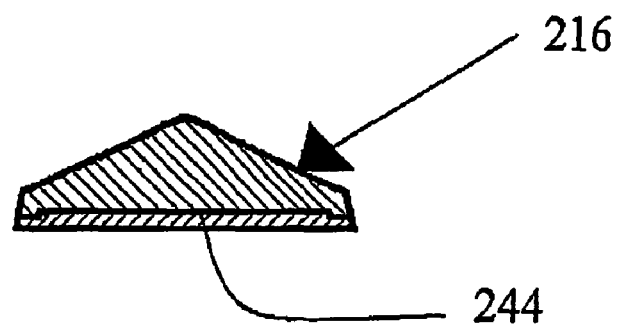
FIG. 10 is an enlarged schematic sectional view of the area indicted by X in FIG. 8.

The molded body 216 and the lower layer material 213 are pressed by the indented mold 232, and welded by the indented mold 232 when a high frequency wave is transmitted. At this time, the molten lower layer material 213 also flows into the recessed sections 244 and welded to the molded body 216 (FIGS. 8(d) and 10). The lower layer material that flows into the recessed sections 244 are not crushed even if they are pressed by the metal mold, so that its bonding or sticking feature is secured. Since the lower layer material 213 flows into the recessed sections 244 of the molded body 216 and welded, a three-dimensional pattern is manufactured with the lower layer material having a bonding or sticking feature arranged on the rear surface thereof.

Since the lower layer material 213 flows into the recessed sections 244, the amount (height) of the lower layer material needs to be determined by taking the amount that flows into the recessed sections 244 into consideration.

Thereafter, the indented mold 232 is pulled up (FIG. 8(d)), and the unnecessary parts is removed. If necessary, an application film is bonded to the surface of the three-dimensional decoration piece. The application film may typically be a transparent plastic film. Since such an application film is bonded, the three-dimensional decoration piece is protected. In addition, when a character part and a graphic part of the three-dimensional decoration piece are separated from each other as shown in FIG. 7, their positions are maintained relative to each other. Any known application film can be used for the purpose of the present invention.

Now, the fourth embodiment of the present invention will be described below.

With the fourth embodiment, it is possible to directly weld a three-dimensional decoration piece to a lower layer material, which may be a fabric or synthetic leather.

Summarily, the fourth embodiment comprises:
(1) firstly laying an intermediate layer material and an upper layer material on a cathode (a flat mold 334 or a table);
(2) pressing the upper layer material and the intermediate layer material from above by means of the indented mold (332) operating as anode, to melt the materials to producing an upper/intermediate layers three-dimensional molded body (316) by molding (a first high frequency dielectric hating step);
(3) pulling up the indented mold (332) with the molded body (316);
(4) laying a base member (314), such as a fabric, on the cathode (the flat mold 334 or the table);
(5) lowering the indented mold (332) with the molded body (316) toward the cathode (334) carrying the base member (314) thereon, and subjecting the molded body (316) to high frequency dielectric heating, to weld it to the base member (314) (the second high frequency dielectric heating step), to manufacture a three-dimensional decoration piece.

The materials that can be used for the fourth embodiment include those listed above for the upper layer material and the intermediate layer material. The base member is typically a fabric or synthetic leather that is not molten by transmission of a high frequency wave as described above.

Figure 11:
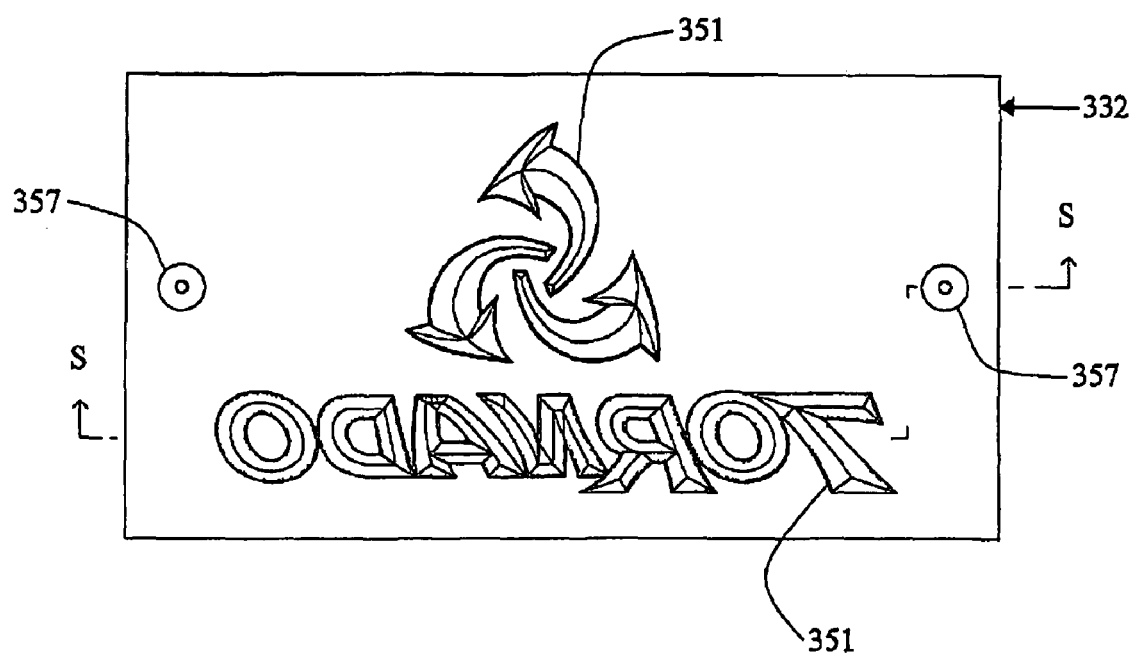
FIG. 11 is a schematic bottom view of the indented mold used in the fourth embodiment of the present invention.
Figure 12:
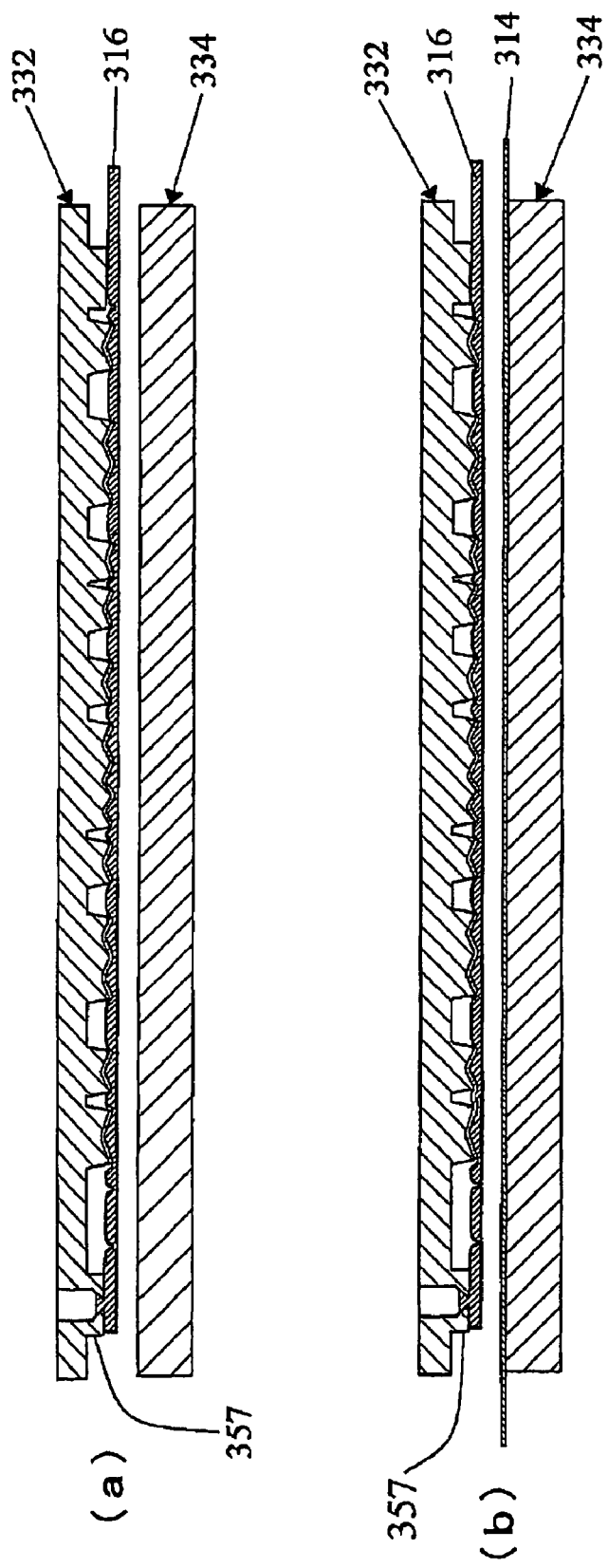
FIG. 12 is a schematic sectional view of a table and the indented mold of FIG. 11, the cross sectional views of the indented mold being taken along line S-S in FIG. 11, illustrating manufacturing steps of the fourth embodiment.

FIG. 11 is a schematic bottom view of the indented mold 332 used in the fourth embodiment. FIG. 12 shows schematic sectional views of the indented mold 332 along line S-S in FIG. 11.

The indented mold 332 is employed for both the first high frequency dielectric heating step and the second high frequency dielectric heating as described above.

The indented mold 332 is equipped with a fusion cutter 351 which is arranged at the position that corresponds to the contouring part of the three-dimensional decoration piece. The fusion cutter 351 is adapted to cut the part or parts of the three-dimensional decoration piece molded from the materials.

After the above described first high frequency dielectric heating step, the indented mold 332 is pulled up. At this time, the upper/intermediate layers three-dimensional molded body 316 is also pulled up with the indented mold 332. Therefore, the indented mold 332 is provided with temporary anchoring members 357. For example, wedge shaped holed may be formed in the temporary anchoring members 357, and the upper layer material and the lower layer material that are molten by high frequency dielectric heating may be poured into the wedge shaped holes, to temporarily anchor the molded body 316. Alternatively, a sticky tape may be applied to a bottom surfaces of the temporary anchoring members 357, to make them stick to the molded body 316. The temporary anchoring members 357 are arranged at the outside of the part where the three-dimensional pattern is molded.

In the fourth embodiment, a cathode may be a flat mold 334 that operates as cathode by itself, or a table that operates as cathode on which a flat mold is arranged.

When manufacturing a three-dimensional decoration piece by the fourth embodiment, firstly an intermediate layer material and an upper layer material are laid on the flat mold 334, and the indented mold 332 is lowered toward the flat mold 334 from above, to press the upper and intermediate layer materials by the indented mold 332. Then, as a high frequency wave is caused to be emitted, the upper and intermediate layer materials are molten, and a three-dimensional pattern is molded to form the upper/intermediate layers three-dimensional molded body 316. In this case, the materials also flow into the wedge shaped holes of the temporary anchoring members 357, to temporarily anchor the molded body 316 to the indented mold 332.

Thereafter, as the indented mold 332 is raised, the molded body 316 rises with the indented mold 332, because they are temporarily anchored to the indented mold 332 by the temporary anchoring members 357 (FIG. 12(a)).

Subsequently, a base member 314 such as a fabric is laid on the flat mold 334 (FIG. 12(b)), and the indented mold 332 is lowered. Then, as a high frequency wave is caused to be transmitted, the molded body 316 is molten and welded to the base member 314. Since the molded body 316 is welded to the base member 314 on the flat mold 334, the base member is not stretched by the indented mold and the protruding mold, so that the base member is not required to have a characteristic being stretchable. Additionally, since the molded body 316 is welded to the base member 314 on the cathode 334 having a flat surface, neither the molded body 316 nor the base member 314 is stretched, so that it is possible to securely and reliably weld the molded body 316 to the base member 314. Thus, the molded body 316 and the base member 314 shows an enhanced bonding strength.

Now, a modified embodiment of the fourth embodiment will be described below.

A protruding mold 433 is employed in place of the flat mold 334 in the first high frequency dielectric heating step in this modified embodiment.

Figure 13:
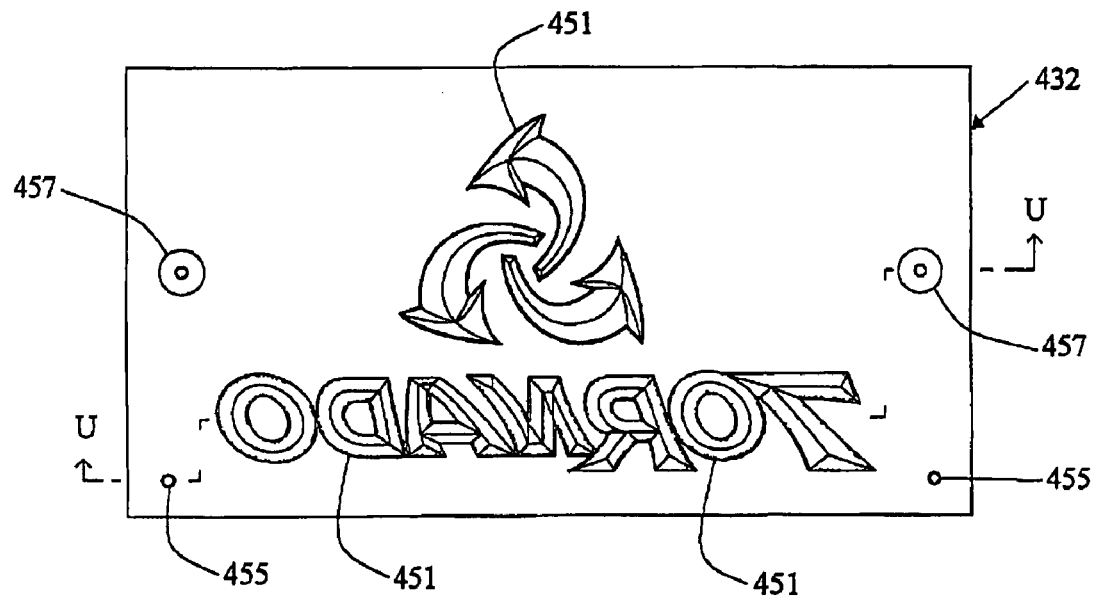
FIG. 13 is a schematic bottom view of the indented mold used in the modified fourth embodiment of the present invention.
Figure 15:
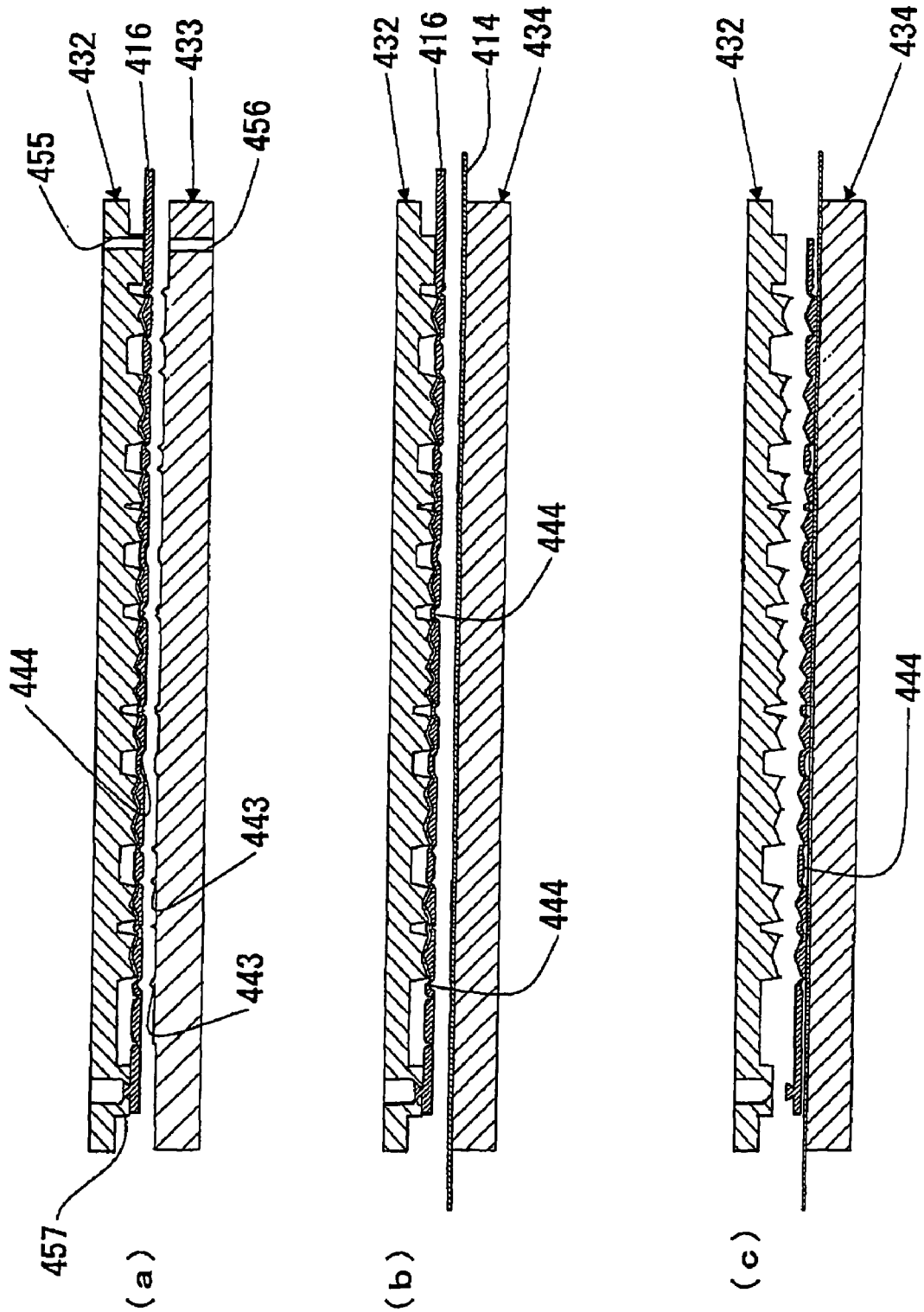
FIG. 15 is a schematic sectional view of a table and the indented mold of FIG. 13 and the protruding mold of FIG. 14, the sectional view of the indented mold being taken along line U-U in FIG. 13, the sectional view of the protruding mold being taken along line V-V in FIG. 14, illustrating manufacturing steps of the modified fourth embodiment.

An indented mold 432 is used with the modified fourth embodiment. FIG. 13 is a schematic bottom view of the indented mold 432. FIG. 15 shows schematic sectional views of the indented mold being taken along line U-U in FIG. 13.

Like the indented mold 332, the indented mold 432 is provided with a fusion cutter 451, which is arranged at the position that corresponds to the contouring part of the three-dimensional decoration piece, and that cut the part or parts of the three-dimensional decoration piece molded from the materials. The indented mold 432 is provided with temporary anchoring members 457 for pulling up the upper/intermediate layers three-dimensional molded body 416 with the indented mold 432. The temporary anchoring members 457 are structurally same as the temporary anchoring members 357.

The indented mold 432 is additionally provided with aligning holes 455 for aligning the indented mold 432 and the protruding mold 433. In other words, the indented mold 432 is structurally same as the indented mold 332 except aligning holes 455.

Figure 14:
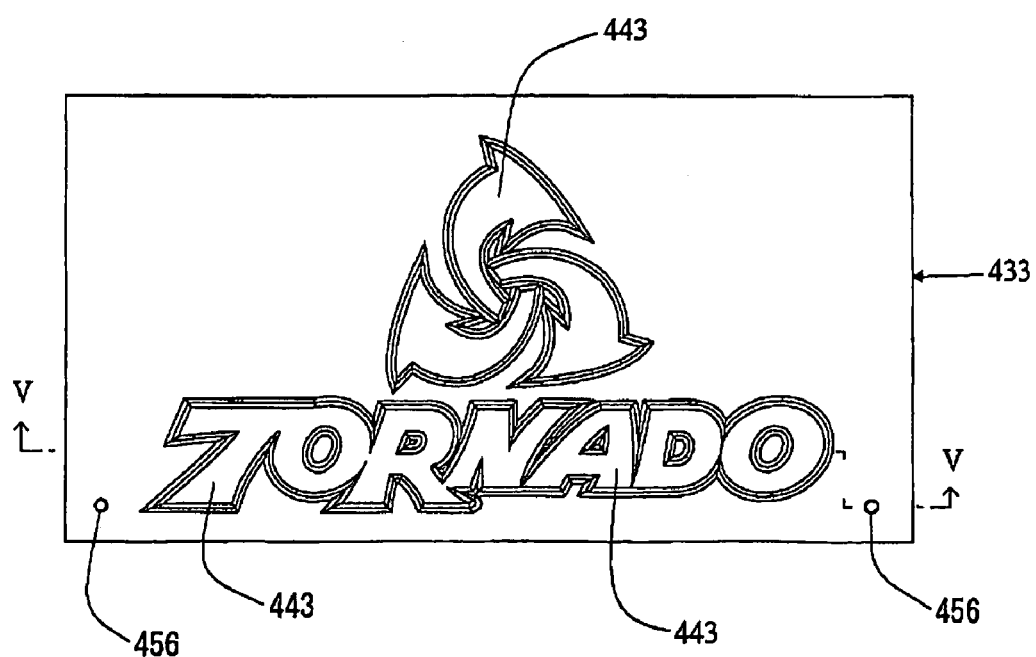
FIG. 14 is a schematic plan view of the protruding mold used in the modified fourth embodiment.

As described above, the modified fourth embodiment employs the protruding mold 433 in place of the flat mold 334 in the first high frequency dielectric heating step. FIG. 14 is a schematic plan view of the protruding mold 433. FIG. 15 shows a schematic sectional view of the protruding mold along line V-V in FIG. 14.

The protruding mold 433 is provided with protruding sections 443. The protruding sections 443 are arranged on the bottom surface of the upper/intermediate layers three-dimensional molded body 416 to produce recessed sections 444 along an outer peripheral part of a fusion cutter 451. Therefore, the protruding sections 443 are arranged along the outer periphery of the fusion cutter 451 that forms the contour line of the three-dimensional pattern part. It is preferable that each of the protruding sections 443 shows a hill-shaped or dome-shaped cross sectional view.

The protruding mold 433 is additionally provided with aligning holes 456 at positions corresponding to the respective aligning pins 455 of the indented mold 432.

Now, the method of manufacturing a three-dimensional decoration piece of the modified fourth embodiment will be described below.

With the modified embodiment, an intermediate layer material and an upper layer material are laid on the protruding mold 433 and the indented mold 432 is lowered. The indented mold 432 and the protruding mold 433 are aligned with each other as aligning pins (not shown) are driven respectively into the corresponding aligning holes 455 and aligning holes 456. The pins are pulled out when the indented mold 432 and the protruding mold 433 are rigidly secured to each other.

As the upper layer material and the lower layer material are pressed by the indented mold 432 and a high frequency wave is caused to be transmitted, the upper layer material and the intermediate layer material are molten to produce a molded three-dimensional pattern, and hence to form an upper/intermediate layers three-dimensional molded body 416. In this case, by means of the protruding sections 443 of the protruding mold 433, recessed sections 444 are formed on a bottom surface of the molded body 416 and along an outer peripheral part of the three-dimensional pattern. The molten materials partly flow into the holes of the temporary anchoring members 457, so that the molded body 416 is temporarily anchored to the indented mold 432.

Then, as the indented mold 432 is raised, the molded body 416 formed with the molded three-dimensional pattern is raised with the indented mold 432, because it is temporarily anchored to the indented mold 432 by the temporary anchoring members 457 (FIG. 15(a)).

Thereafter, the protruding mold 322 is replaced by the flat mold 434, and a base member 414 is laid on the flat mold 434 (FIG. 15(b)).

Then, as the indented mold 432 with the molded body 416 is lowered toward the flat mold 434 carrying the base member 414 thereon, the bottom surface of the molded body 416 comes to contact the top surface of the base member 414 except the recessed sections 444.

The indented mold 432 presses the molded body 416 and the base member 414. As a high frequency wave is caused to be transmitted, the molded body 416 is molten, and bonded to the base member 414 at areas where the molded body 416 and the base member 414 contact with each other. On the other hand, since the recessed sections 444 are not pressed, the molded body 416 is not welded to the base member 414 in those sections where the molded body 416 is apart from the base member 414. The recessed sections 444 are arranged along the outer periphery of the contour line of the three-dimensional pattern, as described above. Therefore, the operation of removing the unnecessary part (the part outside of the contour line of the three-dimensional pattern) is easy, and the three-dimensional pattern can be finished neatly.

Subsequently, the indented mold 432 is pulled up (FIG. 15(c)), and the molds are released. Then, the unnecessary part is removed, and an application film is applied to form a finished three-dimensional decoration piece.

The cross sectional profiles of the indented molds 32, 132, 232, 332, 432 in the above described embodiments may be hill-shaped, dome-shaped, trapezoidal or of any other appropriate form so long as the indented molds can mold a three-dimensional object having a desired profile.

Relating to the high frequency dielectric heating device (a high frequency dielectric molding device) used in each of the above described first through fourth embodiments, any known high frequency dielectric heating device can be used for the purpose of the present invention. For example, the high frequency dielectric heating device may be a single head type high frequency dielectric heating/molding machine, a slide type high frequency dielectric molding machine, or a turn table type high frequency dielectric molding machine. In the case of the single head type high frequency dielectric molding machine, a jig is employed and slid to replace the protruding mold on the table with a flat mold. In the case of the slide type high frequency dielectric molding machine, it is sufficient to place a protruding mold and a flat mold respectively on the left table and the right table. In the case of the turn table type high frequency dielectric molding machine, a protruding mold and a flat mold is sequentially set on the table.

A three-dimensional decoration piece manufactured by a method according to the present invention can be fitted to various objects. For example, a three-dimensional decoration piece having a lower layer made of a sticky agent can be used as an external or internal decoration of an automobile, a motorcycle, a boat or a bicycle. A three-dimensional decoration piece whose lower layer is made of a material having a bonding feature can be thermally transferred onto a cover or a sheet of an automobile, a motorcycle, a boat or a bicycle. It can also be thermally transferred onto an apparel product such as a sports wear, a bag, a miscellaneous article or a wrapping article. A three-dimensional decoration piece formed on a base member can be used as an emblem for an apparel product such as a sports wear, a bag or a miscellaneous article. Alternatively, it may be directly bonded to an object.

The invention claimed is:
1. A method of manufacturing a three-dimensional decoration piece made of synthetic resin, the method comprising:
  laying an intermediate layer material of a thermoplastic synthetic resin and an upper layer material of a thermoplastic synthetic resin on a protruding mold of cathode;

pressing the layers material from above by an indented mold of anode, to melt and mold the materials by high frequency dielectric heating, so as to form a three-dimensional molded body, said molded body being formed with a recessed section on a lower surface thereof, said molded body being temporarily anchored to the indented mold;

pulling up the indented mold with the molded body;

laying a lower layer material having a boding or sticking feature on a cathode having a flat surface;

lowering the indented mold onto the cathode to press the layer materials; and melting the lower layer material by high frequency dielectric heating, so that the lower layer material flows into the recessed section to completely fill the recessed section with the molten lower layer material, so as to weld the molded body and the lower layer material.

* * * * *